(12) United States Patent
Chavez et al.

(10) Patent No.: US 11,972,760 B1
(45) Date of Patent: Apr. 30, 2024

(54) SYSTEMS AND METHODS FOR DETECTING FAKE VOICE COMMANDS TO SMART DEVICES

(71) Applicant: United States Automobile Association (USAA), San Antonio, TX (US)

(72) Inventors: Carlos J P Chavez, San Antonio, TX (US); Sacha Melquiades De'Angeli, San Antonio, TX (US); Oscar Guerra, San Antonio, TX (US); David M. Jones, Jr., San Antonio, TX (US); Gregory Brian Meyer, San Antonio, TX (US); Christopher Russell, The Colony, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 365 days.

(21) Appl. No.: 16/940,866

(22) Filed: Jul. 28, 2020

(51) Int. Cl.
*G10L 15/00* (2013.01)
*G10L 15/08* (2006.01)
(Continued)

(52) U.S. Cl.
CPC ............ *G10L 15/22* (2013.01); *G10L 15/08* (2013.01); *G10L 15/30* (2013.01); *G10L 15/02* (2013.01);
(Continued)

(58) Field of Classification Search
CPC ..... G10L 19/008; G10L 19/167; G10L 15/07; G10L 15/22; G10L 15/30; G10L 15/02; G10L 21/0208; G10L 25/78; G10L 25/87; G10L 15/20; G10L 15/26; G10L 15/063; G10L 25/30; G10L 15/16; G10L 15/05; G10L 15/04; G10L 15/10; G10L 15/08; G10L 15/12; G10L 17/00; G10L 17/02; G10L 19/00; G10L 19/02; G10L 19/04; G10L 19/06; G11C 7/16
See application file for complete search history.

(56) References Cited

U.S. PATENT DOCUMENTS 9,965,685 B2 * 5/2018 Matsuoka ............... G10L 25/51
10,121,472 B2 * 11/2018 Raghuvir ............... G10L 15/32
(Continued)

OTHER PUBLICATIONS

Sugawara, Takeshi et al.; "Light Commands: Laser-Based Audio Injection Attacks on Voice-Controllable Systems" Nov. 4, 2019.

*Primary Examiner* — Vu B Hang
(74) *Attorney, Agent, or Firm* — Fletcher Yoder, P.C.

(57) ABSTRACT

The present disclosure relates to detecting the use of fake voice command to activate microphones of smart devices. In one embodiment, sound characteristics associated with an audio signal from a microphone of smart device may be compared with other microphones of the smart device in order to detect fake voice commands. In another embodiment, sound characteristics associated with the audio signal from the microphone may be compared with a threshold range of stored sound characteristics in order to detect fake voice commands. In some embodiments, a controller may triangulate a position associated with a source of a sound in order to detect a fake voice command. In a further embodiment, a controller may verify that a user or associated electronic device are near a smart device to authorize a voice command.

12 Claims, 3 Drawing Sheets

(51) Int. Cl.
  *G10L 15/22*  (2006.01)
  *G10L 15/30*  (2013.01)
  *G10L 15/02*  (2006.01)
  *G10L 15/10*  (2006.01)

(52) U.S. Cl.
  CPC ........ *G10L 2015/088* (2013.01); *G10L 15/10* (2013.01); *G10L 2015/223* (2013.01)

(56) References Cited

U.S. PATENT DOCUMENTS

| | | | |
|---|---|---|---|
| 10,264,354 B1* | 4/2019 | Lashkari | H04R 3/04 |
| 10,375,340 B1* | 8/2019 | Dodge | H04N 21/42204 |
| 10,715,528 B1* | 7/2020 | Leblang | H04W 4/02 |
| 11,158,317 B2* | 10/2021 | Magielse | G10L 15/22 |
| 2020/0243067 A1* | 7/2020 | Maziewski | G06F 21/566 |
| 2021/0217398 A1* | 7/2021 | Gunaseela | G10K 11/17873 |

* cited by examiner

SYSTEMS AND METHODS FOR DETECTING FAKE VOICE COMMANDS TO SMART DEVICES

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Smart devices (e.g., voice-controllable systems, smartphones, tablets, smart home speakers, smart home devices, smart vehicles) may use one or more microphones to receive audio instructions from users. A microphone may include a diaphragm, a thin membrane, that flexes in response to receiving a signal from an acoustic wave. The diaphragm and a fixed back plate located within the smart device work as a parallel-plate capacitor whose capacitance changes as the diaphragm deforms in response to different sound pressures. Projecting an amplitude-modulated light beam via a laser onto the microphone may also cause movement of the diaphragm. Varying the amplitude of the light beam may cause different degrees of movement of the diaphragm, thereby causing the microphone to interpret the different degrees of movement of the diaphragm as different electrical signals. Thus, it is now recognized that the ability to access and control a microphone of a smart device via a laser projection may result in fake voice commands, data privacy issues, security infringement, and other unauthorized access or hacking concerns.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
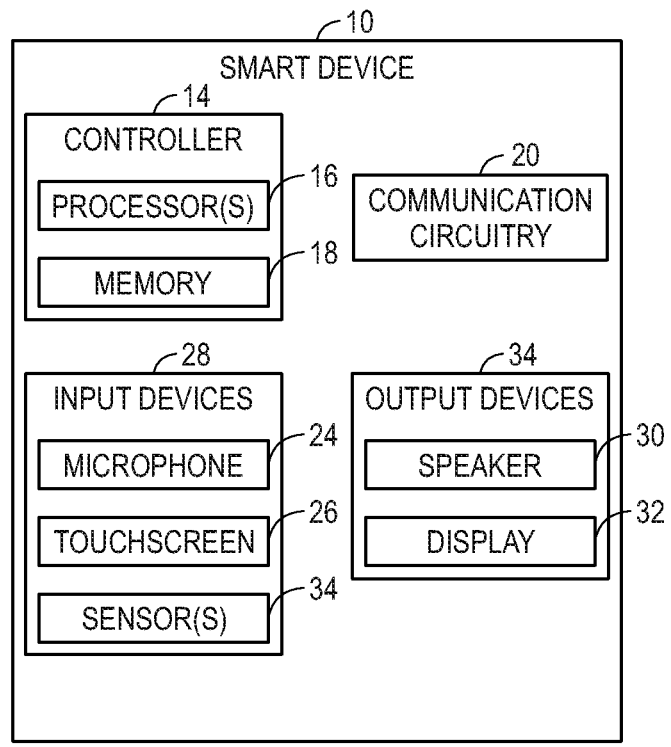
FIG. 1 illustrates a block diagram of a smart device, in accordance with an embodiment of the present disclosure.

The present disclosure relates generally to smart device security. More particularly, the present disclosure relates to systems and methods for detecting fake voice commands to smart devices.

One or more specific embodiments of the present disclosure are described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein detect or facilitate detecting fake voice commands to smart devices (e.g., any suitable electronic device with a processor and a memory). The smart devices may typically have a radio for one or two way communication with other electronic devices. As defined herein, a smart device may include voice-controllable systems, smartphones, tablets, smart home speakers, smart home devices, smart cars, and so forth. Devices such as sensors, speakers, and other appliances may be communicatively coupled to the smart device to detect fake voice commands directed at a microphone of the device. Such devices along with the smart device may be a part of an Internet of Things (IoT) network to be remotely monitored, controlled, and/or accessed and provide services or notifications related to fake voice commands to a user of the smart device. The user may own or be authorized to access the smart device.

Smart devices may use a microphone to receive audio instructions from one or more users. In some embodiments, the smart device may include one or more micro-electromechanical systems (MEMS) microphones. The microphone may include a diaphragm or a thin membrane that flexes or vibrates in response to receiving a signal from an acoustic or sound wave. The microphone may convert the vibrations of the diaphragm into corresponding electrical signals. In some embodiments, the smart device may include a condenser microphone that operates on the principal of capacitance or the ability to store electrical charge. With respect to the condenser microphone, the diaphragm and a fixed back plate located within the smart device work as a parallel-plate capacitor whose capacitance changes as the diaphragm deforms in response to different sound pressures. The varying capacitance may be converted to corresponding electrical signals.

Along with sound or acoustic waves, an amplitude-modulated light beam projected onto the microphone may also cause movement of the diaphragm. The light beam may be projected via any suitable type of laser (e.g., infrared laser). Varying the amplitude of the light beam may cause different degrees of movement of the diaphragm, thereby causing the microphone to interpret the different degrees of movement of the diaphragm as different electrical signals. In some embodiments, a pulse of the light beam may heat up the microphone's diaphragm, which would expand the air around it. By expanding the surrounding air, the diaphragm may create a bump in pressure just as a sound wave may. This variance in pressure of the diaphragm may be interpreted as an electrical signal.

In some embodiments, smart devices may not authenticate received voice commands or queries. Therefore, unauthorized users may take advantage of the ability to access microphones of smart devices by faking voice commands via the light beam projected from any suitable type of laser. For example, the beam of light from an infrared laser may be projected onto the microphone. Since light from an infrared laser may be invisible to the naked eye, the user may not see, thereby being unaware of laser activity.

Moreover, while smart devices may authenticate voice commands or queries (e.g., by correlating the voice command or queries with an authorized person's voice pattern data), unauthorized users may attempt to access the microphones of the smart device via deepfake techniques. As used herein, deepfake may include using fake images, audio data, video data, or other media type that imitates the look and sound of the user of the smart device in order to gain authorized access to the smart device. That is, deepfake techniques may allow unauthorized users to command or control the smart device by presenting themselves as the authorized user via imitation media (e.g., audio, video). Using such deepfake techniques, an unauthorized user may be able to access and control a microphone of a user's smart device. For example, the unauthorized user may be able to hack (e.g., inappropriate access) into a voice-controllable system as well as associated systems and accounts of the user (e.g., smart home systems, smart vehicle systems, financial accounts, online services). Hacking of the user's smart device via deepfake (e.g., voice command) may result in unauthorized access to the user's banking information, ability to open a garage door of the user's home, making online purchases, and so forth.

As such, it may be useful to prevent light beam (e.g., laser) access to microphones of smart devices and notify the user of fake voice commands received via light beam in order to reduce the likelihood of data stealing, securing breaching, hacking of the smart devices and associated computing devices, and so forth by unauthorized users. Indeed, combinations of certain hardware configurations (e.g., circuitry) and software configurations (e.g., algorithmic structures and/or modeled responses) may be utilized to detect fake voice commands via light beam. Throughout the present disclosure, reference is made to lasers and laser light, which may be emitted from one or more lasers. It should be noted that lasers and laser light are examples of light beam emitters and light beams, respectively. Thus, disclosure of a laser and/or laser light should be understood as broadly representing various forms of light emitters and respective light beams in accordance with present embodiments.

In one embodiment, a controller may detect voice commands that are faked via light beam by comparing sound characteristics received from different microphones associated with a smart device. The smart device may include any number or type of microphones. As used herein, sound characteristics may include or be associated with an echo, a frequency, a wavelength, an amplitude, a speed of wave, and the like of an audio signal or loudness associated with a sound. Because a laser light, for example, may typically be aimed at one microphone (among the multiple different microphones of the smart device), if the controller identifies data received from a microphone having different sound characteristics compared to the other microphones, then the controller may determine that an unauthorized user may have accessed the microphone inappropriately and proceeded to use fake voice commands. The unauthorized user may have faked voice commands via laser light. Therefore, the controller may send the smart device of a user a warning or notification regarding the fake voice commands and/or the laser light from a distance (e.g., beyond a typical operational distance for audio-based use).

In another embodiment to detect fake voice commands, a controller may compare sound characteristics received from a microphone of the smart device with a baseline or threshold range associated with stored sound characteristics. In some embodiments, the controller may retrieve the stored sound characteristics from a history or record of collected sound samples or audio signals from the microphone of the smart device from previous time periods. In other embodiments, the stored sound characteristics may be collected by the controller periodically sampling a room in which the smart device may be deployed. If the received sound characteristics are not within the threshold range, then the controller may determine that an unauthorized user may have accessed the microphone using fake voice commands. By way of example, an unauthorized user may project fake voice commands using laser light. The controller may also send the smart device a warning or notification based on identifying the use of fake voice commands.

In a further embodiment, the controller may attempt to triangulate a position of a source of sound (e.g., a voice command) based on data acquired via multiple different microphones within the same timeframe. If the position cannot be calculated or is invalid (e.g., because the voice command was received at a microphone via a laser light), then the source of sound may be associated with fake voice commands. As a result, the controller may send a warning or notification related to the user of fake voice commands to the smart device, thereby informing the user of the smart device.

In an additional embodiment, to prevent fraudulent actions and detect the use of fake voice commands, the controller may utilize WiFi reflection to determine a position of a user in response to receiving an audio signal (e.g., voice command) from a microphone of a smart device. The controller may instruct a WiFi device (e.g., a WiFi router) to emit wireless signals toward the source of the audio signal and capture reflected wireless signals to determine the position of the user based on characteristics of the reflected wireless signals. If the controller determines that the user is near the smart device based on receiving reflected WiFi signals from the user, then the controller may authenticate a voice command received by a microphone. However, if the controller determines that the user is not near the smart device based on the reflected WiFi signals, then the controller may determine that the voice command is fake.

In some embodiments, the controller may verify the user is near or within a threshold distance of a microphone by discovering, within the threshold distance, other devices that the user may own or that the user is authorized to use. If one or more user devices are near the smart device, the likelihood of the user also being near the smart device may be greater compared to if one or more user devices are not near the smart device. It can be appreciated that verifying the user's proximity to the microphone may increase or decrease the likelihood that the audio signal from the microphone may be a result of fake voice commands and/or laser light accessing the microphone. This embodiment may be particularly useful in situations where the microphone is associated with a smart device that is in a fixed location.

In other embodiments, in response to receiving a voice command via the microphone of the smart device, the controller may send a form or any request that requires a response from the user device (e.g., smartphone). If the user is able to successfully complete the form, then the controller may authorize the voice command. As used herein, the form may be a software application form, a web form, and the like, that is editable and presented to the user in a pop-up window via an interface of the user device (e.g., smart phone). The form may include instructions prompting the user to submit credential information, answer questions, and so forth. In some cases, the form may include the voice command so that the user can confirm that they issued the voice command. If the user is able to complete the form, then the controller may authorize the voice command. Furthermore, the controller may determine whether the other electronic device is near the microphone of the smart device. If the other electronic device is within a threshold distance of the microphone, and the completed form is valid, then the controller may authorize the voice command. However, if the controller does not receive a valid form from the other electronic device and determines that the electronic device is not near the microphone, then the controller may send a notification or warning regarding the use of fake voice commands to the smart device and corresponding electronic devices.

Turning to the figures, FIG. 1 depicts a block diagram of a smart device 10, according to embodiments of the present disclosure. A user may own or be authorized to use the smart device 10. The smart device 10 may be designed to receive and respond to audio commands. However, the smart device 10 may also receive information (e.g., sensor information, visual and audio data) related to light beam (e.g., laser) activity. Without necessarily being designed for light beam activity, the smart device 10 may still potentially be controlled in response to receiving information via a laser. Thus, the smart device 10 may include features that deter control in this manner to avoid control by an unauthorized user.

The smart device 10 may include any suitable type of computing device but is not limited to: a voice-controllable system, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the smart device 10 as a physical device, implementations are not so limited. In some examples, the smart device 10 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The smart device 10 may include a controller 14 that executes hardware and/or software control algorithms to detect fake voice commands and/or notify the user regarding the fake voice commands. Moreover, the controller 14 may detect fake voice commands by analyzing data based on triangulating a source of a voice command using multiple sensor inputs, analyzing sound characteristics associated with voice commands, determining a position of a user of the smart device 10 based on any of various inputs, determining whether an electronic device of the user in nearby the smart device 10, and so forth. The controller 14 may include a programmable logic controller (PLC) or other suitable control device. According to some embodiments, the controller 14 may include an analog to digital (A/D) converter, one or more microprocessors or general or special purpose computers, a non-volatile memory, memory circuits, and/or an interface board. For example, the controller 14 may include memory circuitry or devices 18 for storing programs, control routines, and/or algorithms implemented for control of the various system components, sending a notification regarding detection of laser light to the smart device 10 of the user. The controller 14 also includes, or is associated with, input/output circuitry for receiving sensed signals from the one or more sensors, and interface circuitry for outputting control signals. Memory circuitry 18 may store set points, actual values, historic values, and so forth, for any or all such parameters. The controller 14 also may include components for operator interaction with the systems, such as display panels and/or input/output devices for checking operating parameters, inputting control signals representative of set points and desired operating parameters, checking error logs and historical operations, and so forth.

The example smart device 10 illustrated in FIG. 1 includes communication circuitry 20 that enables the smart device 10 to communicate via one or more network connections with other computing devices. For example, the smart device 10 may communicate with other electronic devices of the user. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The smart device 10 illustrated in FIG. 1 includes a number of input devices 28 that enable the smart device 10 to receive input (e.g., commands, queries, authentication credentials) from the user and detect activity in the surrounding environment. The input devices 28 can be external devices that are attached to the smart device 10 via common mechanisms like USB ports and other similarly designed parts. A non-limiting list of example input devices 28 includes: microphones 24, touch screens 26, cameras, and biometric sensors. It should be noted that the input devices 28 may represent a single input device 28 or multiple input devices 28. In certain embodiments, the smart device 10 may include various systems or devices to enable the smart device 10 to exchange information with other systems or devices (e.g., home automation systems, home or vehicle security systems, vehicle diagnostic systems). The smart device 10 illustrated in FIG. 1 also includes output devices 34 to enable the smart device 10 to provide information to the user. A non-limiting list of example output devices 34 include: speakers 30, displays 32, indicator lights, vibration motors, and alarms. It should be noted that the output devices 34 may represent a single output device 34 or multiple output devices 34.

In an example embodiment, the smart device 10 may include a voice-controllable system that includes multiple microphones 24 as principal input devices 28 and one or more speakers 30 as principal output devices 34. For such embodiments, the smart device 10 may be generally programmed to interact with the user via a spoken natural language interface. For example, in certain embodiments, the smart device 10 may remain in a low-power or idle state until it is activated by the user speaking an activation phrase. Further, in certain embodiments, the smart device 10 may be capable of receiving and processing spoken natural language queries from the user and responding to the user using spoken natural language responses. In certain embodiments, the smart device 10 may receive voice commands from the user that may be processed by the smart device 10 and/or by servers of other systems and services to enable the user to, for example, access account functions, access frequently asked question information, access concierge services, or to speak with a customer service representative. In other embodiments, the user may enable the smart device 10 to listen to conversations and, using intelligent speech analytics, artificial intelligence (AI) engines, solution databases, and/or other resources of the smart device 10 to provide helpful suggestions.

In general, such embodiments enable the customer to have an untrained, conversational interaction with the smart device 10, and the smart device 10 may seamlessly bridge communication between the user and other systems or services. As appropriate, the smart device 10 may be capable of providing the user with additional information through other output devices 34 (e.g., the speaker 30) or via a secondary device (e.g., a smartphone or computer display 32) communicatively coupled to the smart device 10.

The controller 14 may include one or more processors 16 (e.g., one or more microprocessors) that may execute software programs to determine the presence of a light beam and provide alerts or notification to a user in response to detecting a light beam, such as a light beam from a laser. The one or more processors 16 (collectively referred to as the "processor 16") may process instructions for execution within the smart device 10. The processor 16 may include single-threaded processor(s), multi-threaded processor(s), or both. The processor 16 may process instructions and/or information (e.g., control software, look up tables, configuration data) stored in memory device(s) 18 or on storage device(s). The processor 16 may include hardware-based processor(s) each including one or more cores. Moreover, the processor 16 may include multiple microprocessors, one or more "general-purpose" microprocessors, one or more system-on-chip (SoC) devices, one or more special-purpose microprocessors, one or more application specific integrated circuits (ASICS), and/or one or more reduced instruction set (RISC) processors. The processor 16 may be communicatively coupled to the other electronic devices of the user.

The one or more memory devices (collectively referred to as the "memory device 18") may include a tangible, non-transitory, machine-readable medium, such as a volatile memory (e.g., a random access memory (RAM)) and/or a nonvolatile memory (e.g., a read-only memory (ROM), flash memory, a hard drive, and/or any other suitable optical, magnetic, or solid-state storage medium). The memory device 18 may store a variety of information that may be used for various purposes. For example, the memory device 18 may store machine-readable and/or processor-executable instructions (e.g., firmware or software) for the processor 16 to execute. In particular, the memory device 18 may store instructions that cause the processor 16 to detect fake voice commands and notify the user regarding the fake voice commands.

The processor(s) 16 may analyze relevant voice command information and send the relevant voice command information, data resulting from analyzing the relevant voice command information, an associated alert, or the like, to a separate system (e.g., a separate smart device via the controller 14. The processor(s) 16 may analyze the relevant voice command information by triangulating a source of a voice command, analyzing sound characteristics associated with voice commands, determining a position of a user of the smart device 10, determining whether an electronic device of the user in nearby the smart device 10, and so forth. The processor(s) 16 and the memory 18 are communicatively coupled to the controller 14. In some embodiments, if the controller 14 is external to the smart device 10, then the controller 14 may enable relevant voice command information, data resulting from analyzing the relevant voice command information, an associated alert, or the like, to be sent to the smart device 10 or a connected smart device. For example, the user may access the relevant voice command information, data resulting from analyzing the relevant voice command information, an associated alert, or the like, via his or her mobile device, computing device, smart watch, and so forth.

Figure 2:
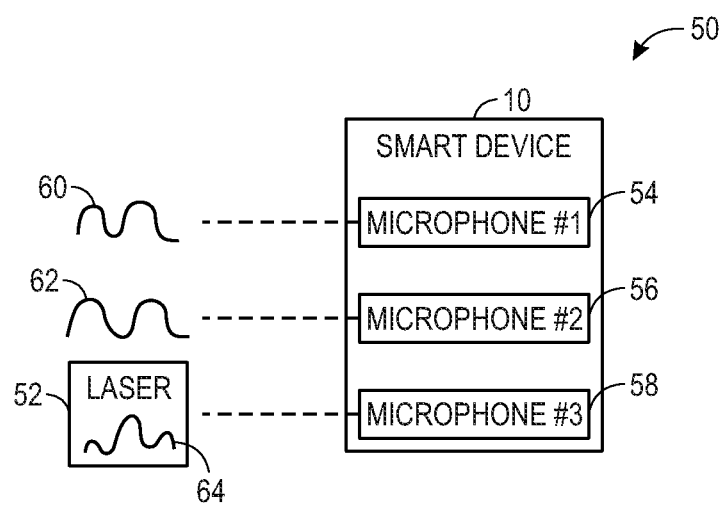
FIG. 2 depicts a block diagram of a fake voice detection system that compares audio signals from one or more microphones of the smart device 10, in accordance with an embodiment of the present disclosure.

With the preceding in mind, FIG. 2 portrays a voice verification system 50 that includes the smart device 10 for comparing audio signals received via multiple microphones of the smart device 10, in accordance with an embodiment of the present disclosure. The smart device 10 may include any number and type of microphones (e.g., micro-electro-mechanical system (MEMS) microphones). As illustrated in the block diagram of FIG. 2, the smart device 10 may include microphones 54, 56, and 58. Generally, given that the controller 14 has activated all three microphones 54, 56, 58, each microphone may receive similar audio signals based on the same source of sound (e.g. voice command) being sent to each of the microphones 54, 56, and 58. However, because each of the microphones 54, 56, and 58 may be disposed in different locations within the smart device 10 (e.g., voice-controllable system), there may be a slight variation in audio signal received by each of the microphones 54, 56, 58 despite the same voice command being sent to each of the microphones 54, 56, 58. For example, the microphone 54 may be located farthest away from the source of the sound relative to the microphones 56 and 58. Therefore, the audio signal received by the microphone 54 may be slightly softer in sound compared to the audio signals received by the microphones 56 and 58.

As mentioned above, the controller 14 may be disposed within the smart device 10. In other embodiments, the controller 14 may be coupled externally to the smart device 10. In order to detect the use of fake voice commands, the controller 14 may compare the sounds or audio signals received by the microphones 54, 56, and 58. In one embodiment, the controller 14 may extract and/or determine sound characteristics from the sound or audio signal received by each of the microphones 54, 56, and 58. As used herein, sound characteristics may be associated with an echo, a frequency, a wavelength, an amplitude, a speed of wave, and the like of an audio signal or loudness associated with a sound. Furthermore, as used herein, if a voice command is faked or the microphone receives a signal (e.g., light signal) with an embedded audio command, the sound characteristics may be based on light characteristics of the signal. It should be noted that reference to an audio command being embedded in a light signal includes a light signal with characteristics that operate to induce a microphone (e.g., the microphones 54, 56, 58) to perceive the light signal as audio waves that correlate to a particular instruction or command. For example, a microphone for a smart device may initiate a phone call based on a perceived audio command that is not actually provided via audio but as the result of compression/contraction of air proximate the microphone and caused by the light signal.

By way of example and as illustrated in FIG. 2, an unauthorized user may access the microphone 58 by faking a voice command via a laser 52. Laser light from the laser 52 may be directed towards the microphone 58, thereby activating the microphone 58 with the faked voice command. Because the laser light may not be directed towards the microphones 54 and 56, the microphones 54 and 56 may not be activated and may not receive the faked voice command at the same time as microphone 58. In some embodiments, the controller 14 may activate the other microphones (e.g., 54 and 56) upon receiving an indication that at least one microphone (e.g., the microphone 58) has been activated (e.g., via the laser 52 or a legitimate voice command). By activating the other microphones 54 and 56 near or at the same time as the microphone 58, the controller 14 may be able to compare the audio signals received by each of the microphones 54, 56, and 58 to determine whether the audio signals are likely to be audio-based and issued from a location within a designated range of range of operability for audio commands.

The controller 14 may analyze sound characteristics associated with each audio signal 60, 62, and 64 received respectively via the microphones 54, 56, and 58. As shown in FIG. 2, because the laser 52 is not directed at the microphones 54 and 56, the audio signals 60 and 62 (e.g., generated by ambient noise) received respectively by the microphones 54 and 56 may be different from the audio signal 64 received by the microphone 58. The audio signal 64 may be embedded in a light signal projected by the laser 52 or may originate from a fake voice command. The controller may determine that the sound characteristics associated with the audio signals (e.g. waveform 60 and 62) received respectively via the microphone 54 and the microphone 56 correlate (e.g., approximately match, have similar sound characteristics such as frequencies and/or amplitudes) with each other. For example, the sound characteristics associated with the audio signals (e.g. waveform 60 and 62) may correlate with each other such that the sound characteristics are within a threshold range of each other. However, the controller 14 may also identify that the sound characteristics associated with the audio signal (e.g., waveform 64) from the microphone 58 deviate from the audio signals (the waveforms 60 and 62) received via the microphones 54 and 56. For example, in comparison to the waveforms 60 and 62, the waveform 64 may have a different volume, different frequency, different amplitude, different background and/or foreground sounds, and the like. Because the sound characteristics received by the microphone 58 differ from the sound characteristics received by the microphone 54 and 56, the controller 14 may determine that the microphone 58 has been activated or accessed by the fake voice command. As mentioned above, the fake voice command may be implemented by aiming laser light at the microphone 58 via the laser 52.

In response to identifying the fake voice command, the controller 14 may send a warning or notification regarding the deviation in sound characteristics associated with the microphone 58 in real-time to a separate system (e.g., a separate smart device) of the user. In some embodiments, the controller 14 may cause the smart device 10 to output the warning or notification via a speaker, display, and the like. Furthermore, the controller 14 may send an indication to a separate system (e.g., a separate smart device) of the user that the microphone 58 may have been accessed using fake voice commands via laser light from the laser 52. For example, the controller 14 may send the notification as an email, SMS text message, and/or via a software application installed on the smart device 10 and/or the other electronic device. Furthermore, the notification may include a visual alert, an audio alert, a vibrational alert, and the like. To prevent harm to the smart device 10, the controller 14 may also take other actions such as deactivating components of the smart device, requiring authentication, locking the smart device, and so forth.

Figure 3:
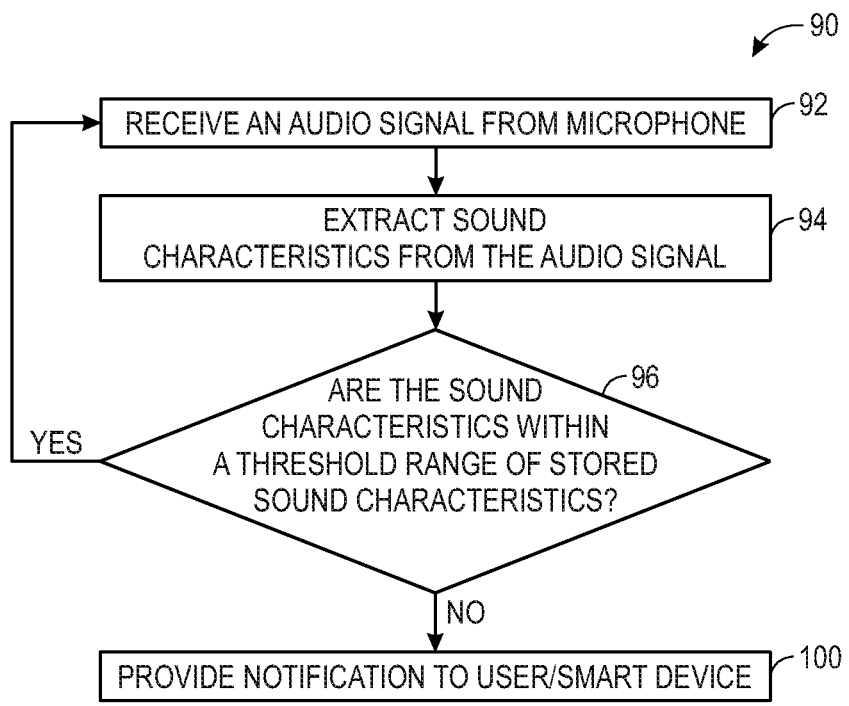
FIG. 3 depicts a flow chart of a process for determining whether an audio signal is within a threshold range via the smart device of FIG. 1, in accordance with an embodiment of the present disclosure.

In another embodiment, to detect fake voice commands, the controller 14 may compare sound characteristics received from the microphone 24 of the smart device 10 with a baseline or threshold range associated with stored sound characteristics. As such, FIG. 3 is a flow chart of a process 90 for comparing sound characteristics of the microphone 24 with the baseline or threshold range, in accordance with an embodiment of the present disclosure. As mentioned previously, the smart device 10 may include any suitable number of microphones (e.g., the microphone 24) and/or any suitable types of microphones. Further, the process 90 may be performed by any suitable device that may control the smart device 10, the controller 14, and/or the processor 16. While the process 90 is described using steps in a specific sequence, it should be understood that the present disclosure contemplates that the described steps may be performed in different sequences than the sequence illustrated, and certain described steps may be skipped or not performed altogether. In some embodiments, the process 90 may be implemented by executing instructions stored in a tangible, non-transitory, computer-readable medium, such as the memory 18, using a processor, such as the processor 16.

As shown in FIG. 3, the controller receives an audio signal or sound from the microphone (block 92). The controller determines sound characteristics associated with the audio signal or sound from the microphone (block 94). The controller may also retrieve the stored sound characteristics associated with the microphone from previous time periods. In some embodiments, the controller may store a history or record of collected sound samples or audio signals from the microphone. In other embodiments, the stored sound characteristics may be collected by the controller 14 periodically sampling a room, in which the smart device may be disposed, for sounds or audio signals. For example, the controller may sample the room when noise levels are generally low (e.g., at 3 AM every day or every week). In another example, the controller may sample the room when the user is away. The controller may determine that the user is away by verifying via an electronic device (e.g., smartphone) that indicates the user is away or displays the location of the user.

By way of example, an unauthorized user may access the microphone by faking a voice command via a laser. Laser light from the laser may be directed towards the microphone 24. In some embodiments, while the microphone may be activated via the laser light or an embedded audio signal in a light signal, other microphones in the smart device may remain inactive. In some embodiments, the controller 14 may determine a baseline or threshold range for sound characteristics (e.g., volume, sound patterns, waveforms, frequencies, and/or amplitudes) based on analyzing the stored sound characteristics. The controller determines whether the received sound characteristics from the microphone are within the threshold range (block 96). For example, the controller may determine whether the received sound characteristics are the within a number of decibels (e.g., within 1 decibel, within 5 decibels) of a baseline volume or amplitude. Other non-limiting examples include the controller determining whether waveforms of the received sound characteristics are within a threshold standard deviation of a baseline waveform, or whether frequency of the received sound characteristics is within a threshold degree range of a baseline frequency. In some cases, the controller may determine whether the volume or amplitude of the audio signal is within a threshold percentage (e.g., 0-35%, 1-25%, 2-15%, 5-10%) of the baseline volume or amplitude, whether the waveform of the audio signal is within a threshold percentage (e.g., 0-35%, 1-25%, 2-15%, 5-10%) of the baseline waveform, whether the frequency of the audio signal is within a threshold percentage (e.g., 0-35%, 1-25%, 2-15%, 5-10%) of the baseline frequency, and so forth. If the received sound characteristics from the microphone are within the threshold range, then the controller may continue receiving new audio signals from the microphone and analyze respective sound characteristics. However, if the sound characteristics from the microphone are not within the threshold range, then the controller may determine that an unauthorized user may have accessed the microphone using a fake voice command.

For example, the controller may extract and/or determine echoes from the audio signal received by the microphone after receiving an indication that the microphone has been activated via a voice command. The controller may also determine a baseline or threshold range for sound characteristics (e.g., volume, sound patterns, waveforms, frequencies, and/or amplitudes) of the extracted echoes based on analyzing stored sound characteristics, associated with a room in which the microphone may be disposed. For example, the stored sound characteristics may include how echoes bounce off a floor, wall, and so forth in a room upon the microphone receiving a voice command from a user (e.g., authorized user of the smart device) in the room.

The controller may determine whether the sound characteristics of the extracted echoes from the audio signal, which is received by microphone, are within the threshold range. For example, the controller may determine whether the sound characteristics of the extracted echoes are the within a range of decibels (e.g., within 1 decibel, within 5 decibels) of a baseline volume or amplitude. Other non-limiting examples include the controller determining whether waveforms of the extracted echoes are within a threshold standard deviation of a baseline waveform or whether frequency of the extracted echoes is within a threshold degree range of a baseline frequency. In some cases, the controller may determine whether the volume or amplitude of the extracted echoes is within a threshold percentage (e.g., 0-35%, 1-25%, 2-15%, 5-10%) of the baseline volume or amplitude, whether the waveform of the extracted echoes is within a threshold percentage (e.g., 0-35%, 1-25%, 2-15%, 5-10%) of the baseline waveform, whether the frequency of the extracted echoes is within a threshold percentage (e.g., 0-35%, 1-25%, 2-15%, 5-10%) the baseline frequency, and so forth. If the sound characteristics of the extracted echoes are not within the threshold range, the controller may determine that the voice command is fake.

In additional or alternative embodiments, the controller may determine a speed of the voice command to determine fake voice commands. For example, a laser device may be pre-programmed to send a voice command to the microphone of the smart device. Generally, such pre-programmed voice commands may have a faster speed compared to the average rate of human speech. Therefore, the controller may determine the speed of the voice command received at microphone. If the speed of the voice command is greater than a threshold rate (e.g., average rate of the user's speech, which may include a range), then the controller may determine that the voice command is fake, and the microphone may have been accessed by a laser.

In response to identifying the fake voice command, the controller may send a separate system (e.g., a separate smart device) of the user a warning or notification regarding the deviation in sound characteristics associated with the microphone from the threshold range in real-time (block 100). In some embodiments, the controller may cause the smart device to output the warning or notification via a speaker, display, and the like. Furthermore, the controller may send an indication to a separate system (e.g., a separate smart device) of the user that the microphone may have been accessed using fake voice commands via laser light. For example, the controller may send the notification as an email, SMS text message, and/or via a software application installed on the smart device and the other electronic device. Furthermore, the notification may include a visual alert, an audio alert, a vibrational alert, and the like.

Figure 4:
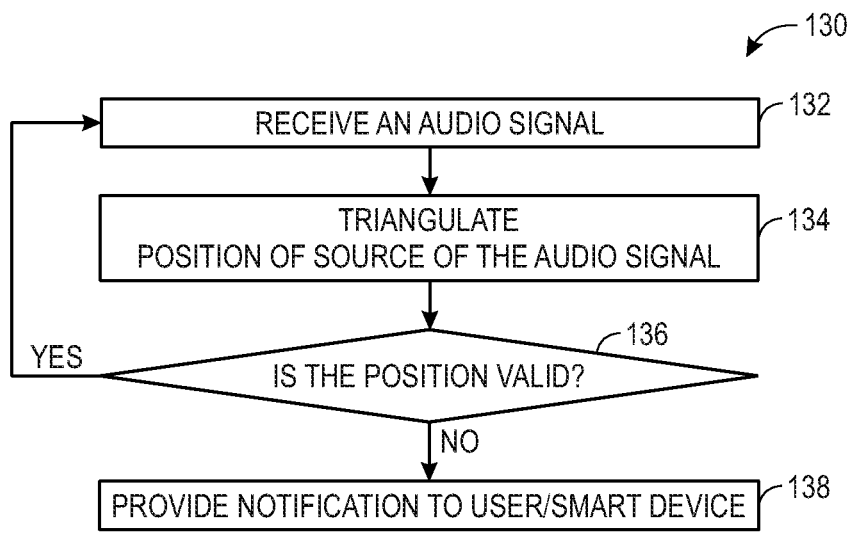
FIG. 4 depicts a flow chart of a process for triangulating a position of a source of sound via the smart device of FIG. 1, in accordance with an embodiment of the present disclosure.

With the preceding in mind, FIG. 4 is a flow chart of a process 130 associated with triangulating a position of a source of sound via a smart device, in accordance with an embodiment of the present disclosure. The process 130 may be performed by any suitable device that may control the smart device, a controller, and/or a processor. While the process 130 is described using steps in a specific sequence, it should be understood that the present disclosure contemplates that the described steps may be performed in different sequences than the sequence illustrated, and certain described steps may be skipped or not performed altogether. In some embodiments, the process 130 may be implemented by executing instructions stored in a tangible, non-transitory, computer-readable medium, such as the memory 18, using a processor, such as the processor 16.

As shown in FIG. 4, a controller receives audio signals (e.g., sound) from a plurality of microphones (block 132). Using the audio signals, the controller triangulates a position (e.g., a likely position of the source based on calculated data) of the source of the audio signal (e.g., voice command) (block 134). While pinpointing a location of the source may be difficult based on the calculated data, the controller may determine a likely position of the source or threshold range or distance the source is within. Triangulating the likely position involves determining the position of the source based on known relative positions (e.g., position of a microphone relative to another) of at least the microphones from which the audio signals are received. As discussed above, these microphones may each be integrated with the smart device that also includes the controller. However, the speakers may also be separate from the smart device but in communication therewith. The controller determines whether the likely position can be calculated or is valid (block 136) based on triangulation. If only one speaker is detecting a perceived sound, a triangulation operation will not be successfully performed because multiple inputs are required for a proper calculation. This may include a lack of perceived sound with sufficient correlation. For example, if two microphones only detect ambient noise while a third microphone detects a perceived audio command, the controller may determine that a lack of overlap between detected signals is insufficient to indicate a common source. Further, even if ambient noise is considered, because a single source is not present, the triangulation calculation may result in a recognized faulty output. If the position can be calculated and is valid, then the controller may continue receiving new audio signals from the microphone and triangulate the position of the source associated with the new audio signal. However, if the position cannot be calculated or is invalid, then the controller may determine that the source of the audio signal (e.g., the voice command) may be fake or the audio signal was embedded in a light signal. The position may not be determinable because the embedded audio signal sent by the laser light may not correspond to a location in the room or building that the smart device is disposed, thus causing triangulation to fail. An unauthorized user may have faked the voice command by aiming laser light at the microphone.

In response to identifying the fake voice command, the controller sends to a separate system (e.g., a separate smart device) of the user a warning or notification regarding the invalidity of the position in real-time (block 138). In some embodiments, the controller may cause the smart device to output the warning or notification via a speaker, display, and the like. Furthermore, the controller may send an indication to a separate system (e.g., a separate smart device) of the user that the microphone may have been accessed using fake voice commands via laser light. For example, the controller may send the notification as an email, SMS text message, and/or via a software application installed on the smart device and the other electronic device. Furthermore, the notification may include a visual alert, an audio alert, a vibrational alert, and the like.

Figure 5:
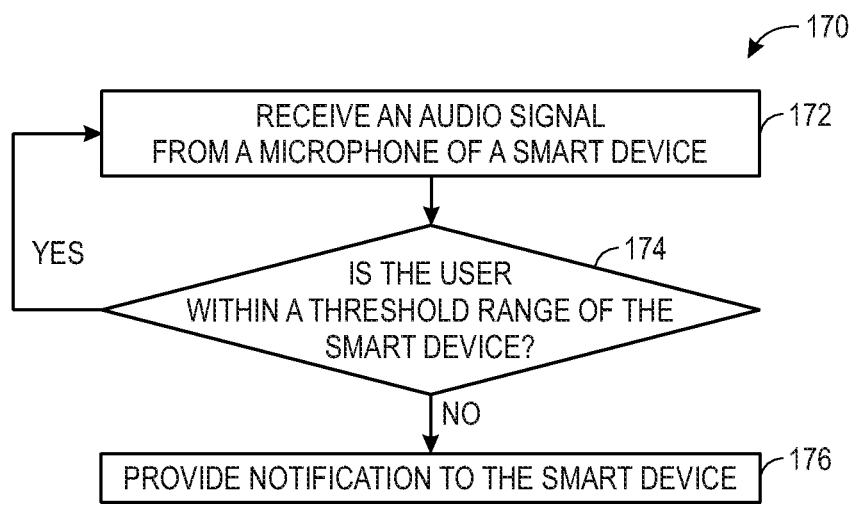
FIG. 5 depicts a flow chart of a process for determining whether a user is within a threshold range of the smart device of FIG. 1, in accordance with an embodiment of the present disclosure.

FIG. 5 is a flow chart of a process 170 for determining whether a user is within a threshold range of a smart device (e.g., the smart device 10), in accordance with an embodiment of the present disclosure. The process 170 may be performed by any suitable device that may control the smart device, which may include the ability to control a controller and/or a processor of the smart device. While the process 170 is described using steps in a specific sequence, it should be understood that the present disclosure contemplates that the described steps may be performed in different sequences than the sequence illustrated, and certain described steps may be skipped or not performed altogether. In some embodiments, the process 170 may be implemented by executing instructions stored in a tangible, non-transitory, computer-readable medium, such as the memory 18, using a processor, such as the processor 16.

In order to prevent fraudulent actions and detect the use of fake voice commands or embedded audio commands in light signals, the controller may determine whether the user of the smart device is within a threshold range from the smart device. According to FIG. 5, the controller receives an audio signal from at least one microphone (e.g., the microphone 24) of the smart device (block 172). Upon receiving the audio signal, the controller determines whether the user is near or within a threshold distance of the smart device that is sufficient to authorize a voice command associated with the received audio signal (block 174). The threshold distance may by any suitable range (e.g., 0-25 ft, 0-50 ft, 0-100 ft) between the user and the smart device that is indicative of a distance for which the microphone of the smart device is capable of receiving the voice command from the user. It can be appreciated that verifying the user's proximity to a microphone that was activated via a voice command may decrease the likelihood that the audio signal from the microphone may be a result of a fake voice command and/or laser light accessing the microphone.

In one embodiment, controller may use WiFi reflection techniques to determine a position of the user (e.g., and thus facilitate determining whether the user is within the threshold distance of the smart device) in response to receiving an audio signal (e.g., voice command) from the microphone. The controller may instruct a WiFi device (e.g., a WiFi router) to emit wireless signals toward the source of the audio signal and capture reflected wireless signals to determine the position of the user based on characteristics of the reflected wireless signals. In some cases, the controller may analyze the reflected wireless signals and determine that the user is indeed within the threshold distance from the smart device (e.g., the user is in the room in which the smart device is disposed or the user is within 10 feet from the smart device). Upon determining the user's proximity to the smart device, the controller may authorize the voice command received by the microphone. Further, the controller may continue analyzing future audio signals received by the microphone based on WiFi reflection to determine whether the user is within the threshold distance from the smart device.

In some embodiments, the controller may verify the user is near or within a threshold distance of the microphone by discovering other electronic devices that the user may own, is authorized to use, or is otherwise associated with in a manner that suggests detecting the electronic device corresponds to physical presence of the user. Such electronic devices may typically be near the user's body or be carried by the user. For example, if a user's smartphone, wearable device, or any other suitable electronic device is near or within the threshold distance of the microphone (e.g., the user's smartphone is in the same room as the smart device), then the likelihood of the user also being within the threshold distance from the smart device may be greater compared to the other electronic device not being within the threshold distance from the smart device. In particular, the controller may communicatively couple to the other electronic device and request a location of the other electronic device (e.g., via location determining techniques, connections to communication hubs such as routers or base stations). As mentioned above, it can be appreciated that verifying the user's proximity to a microphone that was activated via a voice command may decrease the likelihood that the audio signal from the microphone may be a result of fake voice commands and/or laser light accessing the microphone. Upon determining the user's proximity to the smart device, the controller may authorize the voice command received by the microphone. Further, the controller may continue discovering other devices of the user upon receiving future audio signals from the microphone.

In certain embodiments, to determine whether the user is within threshold distance from the smart device, the controller may send, via a limited range transmission, a verification form that requires a response from the user via another user-authorized electronic device (e.g., smartphone) upon receiving the voice command via the microphone. As mentioned previously, the form may be a software application form, a web form, and the like, that is editable and presented to the user in a pop-up window via an interface of the user device (e.g., smart phone). The form may include instructions prompting the user to submit credential information, answer questions, and so forth. For example, the verification form may include completely automated public Turing test (CAPTCHA). In some cases, the form may include the voice command so that the user can confirm that they issued the voice command. If the user completes the form, then the controller may authorize the voice command. Additionally or alternatively, the controller may determine whether the other electronic device (e.g., smartphone) is near the microphone of the smart device. In certain embodiments, if the other electronic device is within a threshold distance of the microphone and the submitted verification form is valid, then the controller authorizes the voice command. Upon authorizing the voice command, the controller may perform actions associated with the voice command received by the microphone. Further, the controller may continue sending verification forms to the user-authorized electronic devices each time an audio signal is received via the microphone.

In additional embodiments, the controller may determine whether the user is near the smart device or within a threshold distance from the smart device by analyzing data from one or more heat sensors 34. The one or more heat sensors 34 may be communicatively coupled to the smart device. The one or more heat sensors 34 may be integral with (e.g., disposed within) the smart device and/or external to the smart device. For example, based on receiving data related to body temperature from the one or more hear sensors, the controller may determine that the user is near the smart device. As mentioned above, the smart device may be a handheld device such as a mobile phone. If the smart device is a handheld device, then the controller may determine the presence of the user near the smart device via data from one or more vibration sensors and/or one or more motion sensors (e.g., accelerometers, gyroscopes). For example, based on receiving an indication of a vibration or movement of the smart device via the one or more vibration sensors or the one or more motion sensors, the controller may determine the user is near the smart device.

If the controller determines that the user is within the threshold distance, then the controller may continue receiving new audio signals from the microphone and determine whether the use is within the threshold distance based on the new audio signals. The controller may verify the user is near or within a threshold distance based on the new audio signals via WiFi reflection, discovery of user devices, the verification form, the one or more heat sensors 34, and so forth as described above. However, if the controller determines that the user is not within the threshold distance of the smart device, the controller may determine the voice command received by the microphone is fake or the voice command was embedded in a light signal. In response to determining the fake voice command, the controller may send the smart device (e.g., the voice controllable system) or other electronic devices (e.g., smartphone, wearable device) of the user a warning or notification regarding the fake voice command in real-time (block 176). Furthermore, the controller may send an indication to the smart device and other electronic devices of the user that the microphone may have been accessed using fake voice commands via laser light. For example, the controller may send the notification as an email, SMS text message, and/or via a software application installed on the smart device and the other electronic devices. Furthermore, the notification may include a visual alert, an audio alert, a vibrational alert, and the like.

While this specification contains many details, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A voice command verification system comprising:
   one or more processors configured to execute computer-executable instructions stored on a non-transitory computer-readable medium, wherein the computer-executable instructions, when executed, cause the one or more processors to:
   receive a light signal comprising an embedded audio command from a first microphone;
   receive an audio signal from a second microphone in response to receiving the light signal from the first microphone;
   determine a first characteristic of the light signal;
   determine a second characteristic of the audio signal;
   determine that the embedded audio command received via the first microphone is not authentic based on determining that the first characteristic does not correlate to the second characteristic; and
   provide a notification in response to determining that the embedded audio command is not authentic.

2. The voice command verification system of claim 1, wherein the first characteristic and the second characteristic each comprise one or more frequencies, wavelengths, amplitudes, wave speeds, waveforms, or any combination thereof.

3. The voice command verification system of claim 1, wherein the one or more processors are configured to activate the second microphone in response to detection of the embedded audio command via the first microphone.

4. The voice command verification system of claim 1, comprising one or more additional microphones wherein the first microphone, the second microphone and the one or more additional microphones each comprise micro-electro-mechanical system (MEMS) microphones.

5. The voice command verification system of claim 1, wherein the one or more processors are configured to provide the notification via transmission to a separate smart device.

6. The voice command verification system of claim 1, wherein the computer-executable instructions, when executed, cause the one or more processors to determine that the embedded audio command received via the first microphone and corresponding to the light signal is authentic based on determining that the first characteristic correlates to the second characteristic.

7. The voice command verification system of claim 1, wherein the computer-executable instructions, when executed, cause the one or more processors to receive a third signal from a third microphone, determine a third characteristic of the third signal, and triangulate a location for a source of the embedded audio command based on the first characteristic, the second characteristic and the third characteristic.

8. The voice command verification system of claim 7, wherein the computer-executable instructions, when executed, cause the one or more processors to determine that the embedded audio command received via the first microphone and corresponding to the light signal is not authentic based on determining that the first characteristic is not within a threshold range of the second characteristic based on the location being triangulated outside of a valid location range.

9. The voice command verification system of claim 1, wherein the computer-executable instructions, when executed, cause the one or more processors to:
  attempt to discover one or more electronic devices within a threshold distance of the voice command verification system;
  determine that the embedded audio command is not authentic based on not detecting the one or more electronic devices within the threshold distance; and
  determine that the embedded audio command is authentic based on detecting the one or more electronic devices within the threshold distance.

10. The voice command verification system of claim 1, wherein the one or more processors are configured to:
  send a verification form to one or more electronic devices based on determining that the embedded audio command was received; and
  perform one or more actions related to the embedded audio command in response to validating the verification form received from the one or more electronic devices.

11. The voice command verification system of claim 1, wherein the one or more processors are configured to determine that the embedded audio command is not authentic in response to receiving a reflected WiFi signal without an indication of a presence of a user within a threshold distance from the voice command verification system.

12. The voice command verification system of claim 1, wherein the one or more processors are configured to determine that the embedded audio command is not authentic based on the first characteristic not being within a threshold range of one or more stored characteristics.

* * * * *